O. F. IMMELL.
TROLLING BAIT.
APPLICATION FILED FEB. 6, 1911.
990,984.
Patented May 2, 1911.
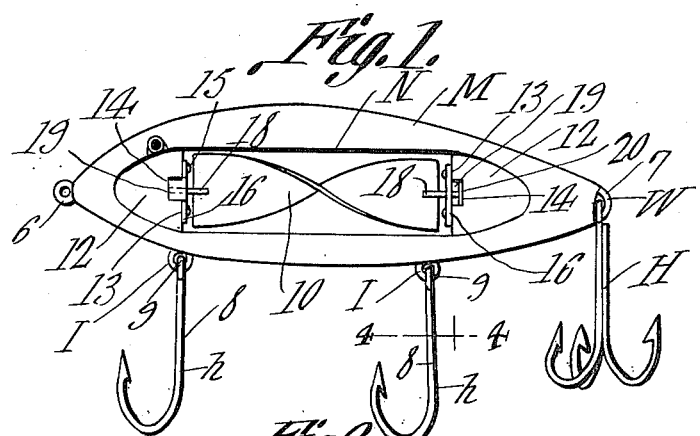
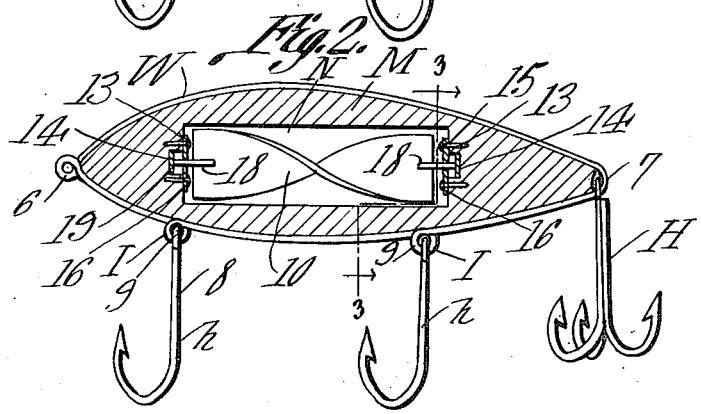
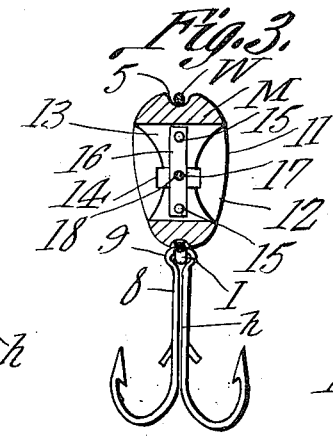
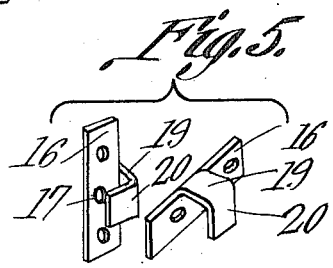
Witnesses
O. F. Immell, Inventor
by Attorneys

UNITED STATES PATENT OFFICE.

OMER F. IMMELL, OF BLAIR, WISCONSIN.

TROLLING-BAIT.

990,984.     Specification of Letters Patent.     Patented May 2, 1911.

Application filed February 6, 1911. Serial No. 606,877.

*To all whom it may concern:*

Be it known that I, OMER F. IMMELL, a citizen of the United States, residing at Blair, in the county of Trempealeau and State of Wisconsin, have invented a new and useful Trolling-Bait, of which the following is a specification.

This invention relates to fishing, and more especially to the artificial baits employed therein and sometimes known as spoons; and the object of the same is to mount the bearings of the spinner or screw in such way that they and it may be removed. This object I accomplish by my improved construction as hereinafter more fully described and claimed, and as shown in the drawings wherein—

Figure 1 is a side elevation of this artificial bait complete. Fig. 2 is a central vertical longitudinal section through the same. Fig. 3 is a cross section on the line 3—3 of Fig. 2. Fig. 4 is an enlarged detail section on the line 4—4 of Fig. 1. Fig. 5 shows the bearing in perspective detail taken from two viewpoints.

In the drawings the letter M designates the body of this improved bait because by preference it is shaped to simulate the contour of a minnow, and W is a wire surrounding this body and having eyes I for flexible attachment of the hooks which are single or double as shown at *h* or may be in gangs as shown at H. The wire is by preference embedded in a groove 5 which is formed in the body M, it has an eye 6 at the nose of the minnow or body and into which the line is secured in a well known manner, it is formed into the usual eyes I beneath said body, and it extends to the rear of the body into a rearmost eye 7 into which is hung the rear hook or hooks H. When this wire completely surrounds the body, a heavy fish caught upon a hook and struggling fiercely will not dislodge it therefrom, and even if he should do it and the body itself is lost the fish is retained.

One feature of my prevent invention lies in forming the hooks with their shanks 8 slightly spaced apart as best seen in Fig. 4 so that there is access permitted to their eyes 9, rather than soldering or brazing the shanks together. The result of this construction is that any type of hook or gang of hooks can be substituted for those shown by slipping its point through one of the eyes I or 7 and drawing its body into place so that its eye 9 engages that on the wire around the body M of the device.

A second feature of my present invention consists in mounting the spinner or spiral 10 within the cavity 11 in the body M in a novel manner. This cavity of course has channels 12 cut into the sides of the body as best seen in Fig. 3 in order that the flow of the water through them may act upon the spiral 10, but the front and rear ends of the cavity 11 are cut off flat as shown at 13 and provided with cross notches 14 best seen in Fig. 1. To each of these ends by means of pins or screws 15 is attached a plate 16 having through its center a hole 17 for reception of the spindle 18 at the end of the spiral 10, and at the side of the plate is formed a lip 19 which is bent first at right angles to the plate and then at right angles to its body so as to stand parallel with the plate as indicated at 20 in Fig. 5 and to thus form a stop lying in the bottom of the notch 14 and against which the end of the spindle 18 rests. It is obvious that by removing the pins 15, the entire plate can be withdrawn laterally from the cavity 11 in the body M, and the spinner or spiral removed from place as for substitution or repair. The spindles 18 are fixed at the extremities of the axis of said spiral by any suitable means, and are preferably of rather hard metal so that they will be durable. When a slow acting spinner is desired, one with a reduced number of convolutions or spirals is used; and vice versa. The plate 16 is also preferably of rather hard metal, as well as its lip against which the extremity of the spindle bears. The remainder of the device may be of any suitable material, and ornamented to accord with the pleasure of the manufacturer or user.

What is claimed is:

In an artificial bait, the combination with a minnow-shaped body having a transverse cavity with each end cut off square and provided with a transverse cross notch; of a spiral having a spindle projecting axially from each end thereof, and a bearing for each spindle comprising a plate having three holes through it and a lip of a size to fit said notch bent from the edge of the plate and then parallel with it across the central hole, and pins passing through the endmost holes into the end wall of the cavity.

In testimony that I claim the foregoing as my own, I have hereto affixed my signature in the presence of two witnesses.

OMER F. IMMELL.

Witnesses:
THEO. A. KOUF,
P. J. JONSRIED.